Figure 3:
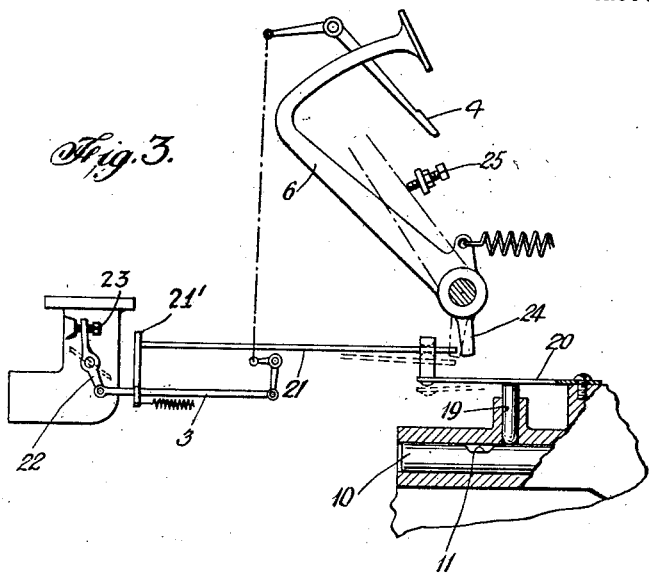

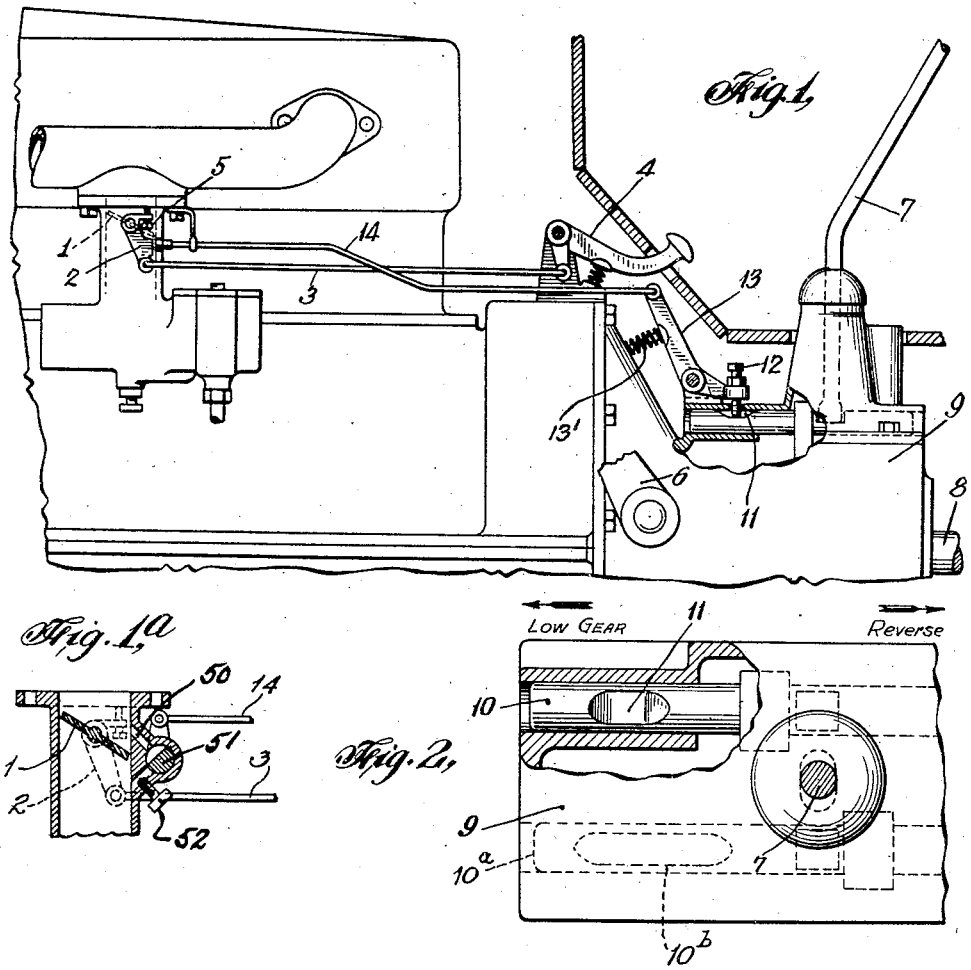

Nov. 8, 1932. J. GOOD 1,886,672
AUTOMOBILE CONTROL
Filed July 29, 1926 2 Sheets-Sheet 2

Patented Nov. 8, 1932

1,886,672

UNITED STATES PATENT OFFICE

JOHN GOOD, OF GARDEN CITY, NEW YORK, ASSIGNOR TO GOOD INVENTIONS CO., OF NEW YORK, N. Y., A CORPORATION OF NEW YORK

AUTOMOBILE CONTROL

Application filed July 29, 1926. Serial No. 125,648.

The object of the invention is to facilitate the operation of driving automobiles and is accomplished by the provision of means for insuring an appropriate engine speed under certain conditions whereby less attention to the engine is required of the driver and more attention can therefore be given by him to the general management of the car. The invention can be applied to any of the existing types of automobiles propelled by internal combustion engines, and in a great variety of forms differing widely among themselves as to their structure and their mode of application to the mechanism of the automobile.

In the drawings,

Fig. 1 is a side elevation of a conventional automobile power plant and its power transmission mechanism incorporating the invention in one of its several forms.

Fig. 2 a larger scale plan of a portion of the gear-set thereof.

Fig. 3 a detail of a modified form, and

Figure 4:
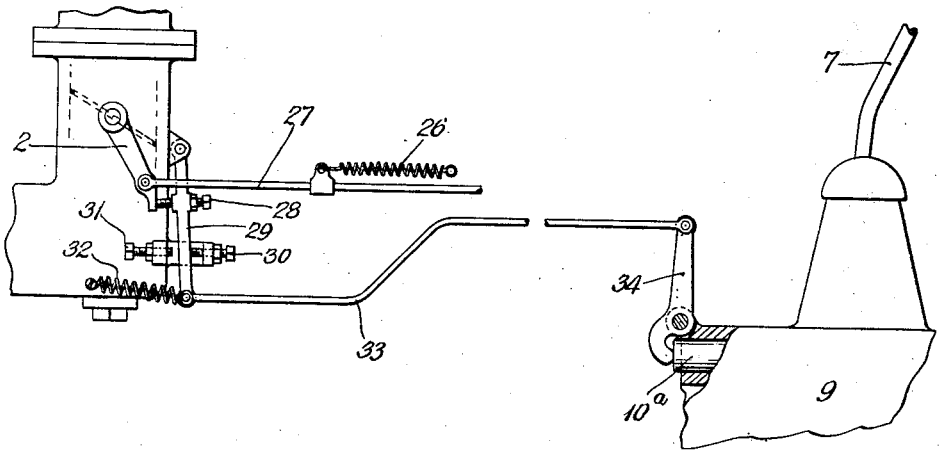

Figs. 1a and 4 are further modifications described below.

Referring to Fig. 1, the engine throttle 1 is connected by its crank arm 2 and throttle rod 3, to a throttle lever 4, which may be and usually is a foot pedal, as shown, sometimes called the accelerator, its function being to control the fuel admission to the engine as usual and hence the speed of the car. The spring which is shown as applied to the lever 4 serves to close the throttle when the driver removes his foot from the pedal but such closure takes place only to the extent permitted by the throttle abutment screw 5 which is carried by the throttle crank and strikes against the carburetor connection flange or some other relatively fixed member. The screw 5 is commonly called the idling adjustment, since its position determines the speed at which the engine runs when not used for propelling the car. This is a common arrangement of engine control but, within this invention, it may be substituted by any other means for establishing a minimum fuel supply and a corresponding idling adjustment of the engine. The engine is also provided with a clutch pedal 6, and with a gear-set and shift lever 7, whereby it can be connected in different drive ratios to the propeller shaft 8 which drives the vehicle wheels. These parts are indicated in conventional form and are likewise subject to substitution by other forms. The gear-set or change-speed mechanism marked 9, includes the usual pair of shifter-fork bars, 10 and 10ª, adapted to be selectively reciprocated by manipulation of the shift lever 7 so as to establish the different drive ratios. The gears themselves are not shown as the operation of this type of mechanism is well known. It may be assumed that the forward position of the shifter bar 10, puts the transmission in "low gear" and the rearward position in "reverse", the intermediate or middle portion being "neutral", and that the similar bar 10ª similarly establishes the intermediate and high gear settings.

In accordance with this invention, some member of the automobile mechanism for example one of the shifter-fork bars is correlated with the engine speed control means so as to suspend or interrupt the function of the throttle limiting device, which is represented in the present case by the screw 5, and thus establish a different engine speed when the throttle pedal is released. In the present case a cam notch 11 is formed in the top of the bar 10 to coact with a bearing screw 12 carried in one arm of a bell crank lever 13, the other arm of which is connected to a push rod 14 extending to the engine throttle or to some member by which the closing movement of the throttle can be limited. The spring 13', which may be connected at any convenient point, urges the bearing screw 12 toward the shifter bar. When the bar is in neutral the notch registers with the screw as shown in Fig. 1 and the spring holds the end of the push rod 14 out of the normal path of the throttle crank. When the shifter bar is in either of its other positions, the push rod 14 is advanced and either engages the throttle crank 2 to open the throttle slightly or else prevents it from closing to the extent set by the limit screw 5, according to the throttle position at the time of change. Thus while the bar is set either in "low" or "reverse", the engine is prevented from diminishing its speed to the same extent as permitted at other times. The effect of this auxiliary minimum limit device is to perform automatically the same process which the driver must otherwise perform by hand or foot, whenever he starts the car in motion, that is to say, the speeding up of the engine in order to avoid stalling it by the load of starting. The minimum speed permitted by the advanced push rod is predetermined as by adjusting the screw 12 so as to accommodate the average starting load, and thus the driver, having made a gear-setting, may close the clutch at once without removing his foot from the brake pedal or adjusting the hand throttle. It will be apparent that the effort of operating the car is by so much facilitated.

In the preferred form of Fig. 3, the fuel supply control associated with the change speed mechanism is so correlated to the clutch controlling pedal that the increase of the speed, appropriate to the setting of said mechanism, is made effective during clutch closing. In this form the shifter fork bar 10 is provided with a cam recess 11 as before, engaging a round nosed plunger 19 acting by its upper end on a spring push rod holder 20. The end of the push rod 21 is slidably held by the holder 20 and its forward end is connected to open the throttle as by butting against the arm 21' which is secured to the throttle rod 3. The throttle crank 22, carries, as before, the throttle abutment screw 23 for adjusting its most closed or idling position. When the gear set lever is put in first or reverse position, the link holder 20 is raised by the plunger 19 to the position indicated in full lines, wherein it raises the push rod to a position in which it is engaged and advanced by the stub arm 24 carried on the clutch shaft when the clutch is allowed to close. This opens the throttle enough to increase the engine speed as much as necessary to accommodate the particular work to be done, and this higher minimum speed limit is effective so long as the gear lever remains in the position stated and the clutch closed. The clutch pedal is of course depressed when the gear-shift lever is being adjusted so that the clutch arm 24 and the push rod do not strike in the wrong position.

The invention includes also the control of the engine speed by the second or intermediate speed adjustment of the gear set, as for example, by means of the shifter bar 10$^a$, used for establishing that setting, it being very common to start cars in second gear. On such occasions increase of the engine speed is desirable because the starting load is even greater than it is in first or reverse, and this extension of the invention is easily carried out by applying a similar but longer cam notch such as 10$^b$ (in Fig. 2) which is connected to the bell crank 13 to rock it forwardly when in intermediate position but not when in neutral or high gear.

But the invention is not limited to the speeding up of the engine merely when starting the car, for it will be observed that on any change from a higher to a lower speed ratio, as from high to intermediate, or intermediate to low, an increased engine speed is generally necessary to permit the gear teeth to mesh easily and this is produced by the speed-up means above described without attention on the part of the driver. It will be understood, also, that broadly considered, it is not material how the change is brought about so long as the higher minimum limitation does not obtain when the car is in high gear, or when the lower minimum limit is not likely to result in stalling the engine. The engine speed, that is needed for starting or gear shifting is generally higher than desired or suitable for high gear driving, or when the car is travelling by momentum or gravity. Accordingly the invention can be expressed by a reversal of the linkage systems above described as, for example, as shown by Fig. 4. In this form of the invention the throttle crank 2 is normally urged toward its closed position by the throttle spring 26 connected to the existing throttle operating rod 27 and its closed position is determined by a set screw 28 carried by a lever 29. This lever plays between two limit screws 30 and 31, fixed on the carburetor, being urged to the left by a spring 32 and connected by a flexible link connection 33 to a bell crank 34 on the gear set 9. When the latter is put in its high gear position, as indicated in this figure, the shifter bar 10$^a$ moving forward rocks the bell crank to pull the lever 29 to the right and against the limit screw 30. In this position the throttle, when released by the driver will close by the influence of the spring 26 to that position corresponding with the lowest engine speed suitable for driving the car in high gear, that is to say to the lowest of two minimum limits. As soon as the car is placed in some other gear, the spring 32 acts to swing the lever 29 against the opposite limit screw 31, thereby automatically slightly opening the throttle to that position which corresponds with the higher engine speed required for starting, etc., that is to say, to the higher of two minimum limits. It may be observed that in this form, when the car is in neutral setting, the idling speed of the engine may be somewhat higher than necessary to keep it in motion, but this is not objectionable inasmuch as a fast idle is often preferred and is sometimes desirable for warming up a cold engine, and in any event when the engine is warm, it can be stopped if not to be used; as for example, by means of the control system disclosed in the application of Malcolm Stevensen and John Good, Serial No. 91,837, filed March 2, 1926.

It will be appreciated that the apparatus shown in the drawings is largely diagrammatic for illustrating the principles of the invention which can be variously embodied to produce the several effects stated.

I claim:

1. In an automobile the combination with the engine and its change speed mechanism, of manually controlled fuel supply means for establishing a minimum limit to the engine speed when connected in high gear and automatic means for preventing the operation of the manual means to establish said limit on the engine speed when connected in lower gear and adapted to establish a higher minimum limit at such time.

2. In an automobile, the combination of the propelling engine, fuel supply means and a driver's control therefor, a spring for reducing the fuel supply when the control is released by the driver, means operative when said spring is effective to establish a rate of supply corresponding to normal idling, change speed transmission mechanism operable by the driver and a clutch pedal adapted to prevent reduction of the fuel supply to a point corresponding to normal idling, said function of the pedal being controlled by the transmission mechanism.

3. In an automobile, the combination of a propelling engine, an operator's control comprising a clutch pedal, an idling adjustment device normally active to establish a predetermined minimum engine speed, means for varying the engine speed above such limit including an element movable out of and into the path of the clutch pedal, for operation thereby, and a second operator's control for moving said element.

4. In an automobile, the combination with a propelling engine and variable speed transmission, means for varying the engine speed comprising a fuel valve and operating mechanism therefor including a clutch pedal and a transmission control lever movable to render said mechanism operable or inoperable by the clutch pedal.

5. In an automobile, the combination of an engine and fuel supply means, change speed transmission mechanism and an operator's control member therefor, a clutch and a pedal for controlling the same, said mechanism having a fuel supply control associated therewith and correlated to said pedal to increase the fuel supply and engine speed, during manipulation of said pedal to close the clutch, according to the setting of said member.

In testimony whereof, I have signed this specification.

JOHN GOOD.